(12) United States Patent
Takenaka et al.

(10) Patent No.: US 6,210,596 B1
(45) Date of Patent: Apr. 3, 2001

(54) MAGNETIC CERAMIC COMPOSITION AND INDUCTOR USING THE COMPOSITION

(75) Inventors: Kazuhiko Takenaka, Yokaichi; Tatsuru Takaoka, Omihachiman, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/221,650

(22) Filed: Dec. 23, 1998

(30) Foreign Application Priority Data

Dec. 26, 1997 (JP) .................................... 9-359462
Jun. 30, 1998 (JP) ................................... 10-183603

(51) Int. Cl.$^7$ ..................................................... H01F 1/37
(52) U.S. Cl. ................. 252/62.6; 252/62.59; 252/62.61; 252/62.62; 310/155; 336/234
(58) Field of Search ............................... 252/62.62, 62.6, 252/62.61, 62.59; 310/155; 336/234

(56) References Cited

U.S. PATENT DOCUMENTS 4,238,342 * 12/1980 Im et al. ........................... 252/62.62
4,357,251 * 11/1982 Johnson, Jr. et al. ............. 252/62.62

FOREIGN PATENT DOCUMENTS

| 2712257 | * | 9/1978 | (DE) . |
| 1110708 |   | 4/1989 | (JP) . |
| 2-009767 |  | 1/1990 | (JP) . |

* cited by examiner

Primary Examiner—C. Melissa Koslow
(74) Attorney, Agent, or Firm—Ostrolenk, Faber, Gerb & Soffen, LLP

(57) ABSTRACT

A magnetic ceramic composition containing ferrite serving as a primary component and a sintering aid. The composition can be sintered at low temperature. The sintering aid contains about 2–45 mol % $Li_2O$; about 5–40 mol % RO, with R being at least one of Ba, Sr, Ca, and Mg; and about 30–70 mol % $(Ti, Si)O_2$ with $SiO_2$ accounting for at least about 15 mol %. The resultant composition provides inductor elements in which migration of inner conductors is suppressed, and insulation deterioration and increase of direct-current resistance is restrained.

17 Claims, 1 Drawing Sheet

MAGNETIC CERAMIC COMPOSITION AND INDUCTOR USING THE COMPOSITION

BACKGROUND OF THE INVENTION

1. Field of the Invention

The present invention relates to a magnetic ceramic composition and to inductor elements using the composition.

2. Description of the Related Art

A magnetic ceramic composition typically contains ferrite as a primary component. Japanese patent Application Laid-Open (kokai) No. 1-110708, for example, discloses a magnetic ceramic composition containing ferrite and borosilicate glass. This publication also discloses inductors, such as chip inductors and LC complex elements, which make use of the magnetic ceramic composition as a magnetic substance. These inductors are constituted by laminated elements containing inner conductors.

According to the above publication, a magnetic ceramic composition containing ferrite and borosilicate glass provides chip inductors and ferrite-sintered bodies which have enhanced mechanical strength, can be sintered at a low temperature and are endowed with high frequency characteristics. Also, the above publication indicates that when LC complex elements are to be obtained, the above composition does not cause warping or separation even when the composition is co-sintered with an inductive material.

However, use of the above-mentioned composition containing ferrite and borosilicate glass tends to allow migration of inner conductors, which leads to the problems of insulation deterioration in the resultant inductor elements and an increase in direct current resistance.

SUMMARY OF THE INVENTION

Accordingly, an object of the present invention is to provide a magnetic ceramic composition and inductor elements using the composition which resolve the above-mentioned problems.

In one aspect of the present invention, there is provided a magnetic ceramic composition containing ferrite serving as a primary component, and a sintering aid. The composition is characterized in that the sintering aid contains no boron, so as to solve the aforementioned technical problems.

In the composition of the present invention, the sintering aid preferably has the following composition: about 2–45 mol % $Li_2O$, about 5–40 mol % RO (wherein R is at least one of Ba, Sr, Ca, and Mg), and about 30–70 mol % (Ti, Si)$O_2$ (wherein $SiO_2$ accounts for at least 15 mol %).

Preferably, the sintering aid content of the magnetic ceramic composition of the present invention is about 0.05–30 parts by weight with respect to 100 parts by weight of ferrite.

In one specific embodiment of the present invention, at least a fraction of the sintering aid comprises silicate glass.

Also preferably, the magnetic ceramic composition of the present invention further contains about 0.01–10 parts by weight of $Bi_2O_3$ with respect to 100 parts by weight of ferrite.

In the cases described above, i.e., in cases in which the composition contains $Bi_2O_3$ and at least some fraction of the sintering aid is silicate glass, a portion of $Bi_2O_3$ may be present as a component of the silicate glass.

In the magnetic ceramic composition of the present invention, the ferrite is preferably a Ni-based ferrite, Ni-Zn-based ferrite or Ni-Cu-Zn-based ferrite.

In another aspect of the present invention, there is provided an inductor element in which the above-described magnetic ceramic composition is used as a magnetic substance.

Particularly, the present invention is advantageously applied to an inductor element in the form of a laminated element which contains an inner conductor.

DESCRIPTION OF PREFERRED EMBODIMENTS

Figure 1:
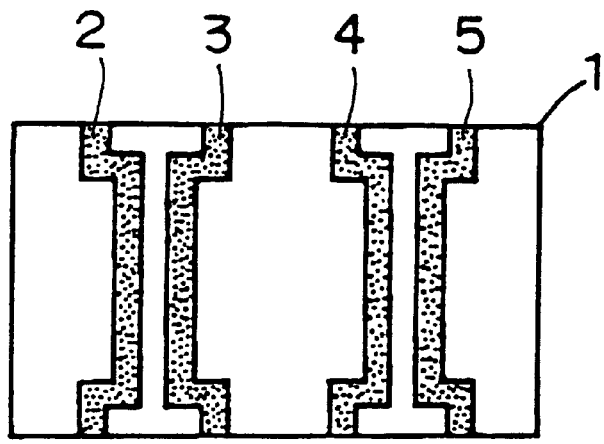
FIG. 1 is a plan view showing a green sheet 1 fabricated in one embodiment of the present invention.

As mentioned above, the magnetic ceramic composition according to the present invention comprises ferrite and a sintering aid containing no boron. Use of the composition can suppress the migration of inner conductors, restrain insulation deterioration and the increase of direct-current resistance in the obtained inductor elements, and produce elements having excellent high-frequency characteristics. Moreover, use of the composition enables low-temperature sintering.

Furthermore, as mentioned above, the sintering aid preferably contains $Li_2O$ in an amount of about 2–45 mol %, RO (R represents at least one element selected from the group consisting of Ba, Sr, Ca and Mg) in an amount of about 5–40 mol %, and (Ti, Si)$O_2$ in an amount of about 30–70 mol % ($SiO_2$ in an amount of about 15 mol % or more).

When the primary component ferrite is sintered, the above-described sintering aid is added in a predetermined ratio to the primary component, followed by mixing, forming into shaped products, and then sintering. In the process, each of the above-mentioned components that constitute the sintering aid may be respectively added to the primary component, or there may be used a premixed sintering aid containing all of the components that has been vitrified by being fused by heat and powdered.

In the above embodiment, the amounts of the respective components that constitute the sintering aid are limited to the above-mentioned preferable range because of the following reasons.

A sintering aid containing $Li_2O$ in an amount of less than about 2 mol % requires a sintering temperature of higher than 930° C. and makes very difficult the use of inner conductors of, for example, 100% Ag. On the other hand, a sintering aid containing $Li_2O$ in an amount of more than about 45 mol % softens the shaped products in the sintering process and makes it impossible for the sintering aid to function properly.

A sintering aid containing RO in an amount of less than about 5 mol % or of more than about 40 mol % also requires a sintering temperature higher than 930° C.

A sintering aid containing (Ti, Si)$O_2$ in an amount of less than about 30 mol % or more than about 70 mol % also requires a sintering temperature higher than 930° C. Note that (Ti, Si)$O_2$ means the combination of $TiO_2$ and $SiO_2$.

Similarly, in cases in which the $SiO_2$ content in (Ti, Si)$O_2$ accounts for less than about 15 mol %, and in cases in which no $TiO_2$ is present, a sintering temperature higher than 930° C. is required.

Depending upon the type of the primary component ferrite, the amount of the sintering aid is, as mentioned above, preferably determined within a range of about 0.05–30 parts by weight with respect to 100 parts by weight of ferrite. This is because further reduction in sintering temperature can hardly be expected if the sintering aid is in an amount of less than about 0.05 parts by weight or more than about 30 parts by weight.

As described above, there is used a sintering aid which contains at least silicate glass in one embodiment.

Depending upon the type of the primary component ferrite, as mentioned above, the magnetic ceramic composition according to the present invention preferably further contains $Bi_2O_3$ in an amount of about 0.01–10 parts by weight with respect to 100 parts by weight of ferrite. This is because a magnetic ceramic composition containing $Bi_2O_3$ in an amount of less than about 0.01 parts by weight requires a sintering temperature of higher than 930° C., and, on the other hand, a magnetic ceramic composition containing $Bi_2O_3$ in an amount of more than about 10 parts by weight often results in poor contact between inner conductors and outer conductors because of the occurrence of diffusion of Ag in the case where the inner conductors contain Ag.

In the case in which a magnetic ceramic composition contains $Bi_2O_3$, and at least a fraction of the sintering aid is silicate glass, at least a portion of the $Bi_2O_3$ may be present as one component of silicate glass.

Ni-based ferrite, Ni-Zn-based ferrite or Ni-Cu-Zn-based ferrite may be used as ferrite serving as the primary component.

EXAMPLE 1

In order to obtain sintering aids composed of silicate glass whose compositions are shown in Table 1 below, oxides, carbonates, or hydroxides of the respective components were mixed, fused and then rapidly cooled. The silicate glass obtained was subjected to dry milling for 16 hours in POLYPOT with alumina balls serving as crushing balls.

Independently, in order to obtain the primary component ferrite, 47.5 mol % $Fe_2O_3$, 15.5 mol % ZnO, 27.0 mol % NiO and 10.0 mol % CuO were mixed.

The sintering aids and $Bi_2O_3$ were mixed in the amounts (parts by weight) shown in Table 1 with respect to 100 parts by weight of the above-mentioned ferrite component and subjected to wet milling for 16 hours in POLYPOT with alumina balls serving as crushing balls. Then, an acrylic-emulsion binder was added in an amount of 18 wt% to the ferrite component and mixed through use of the doctor blade method to produce 50-$\mu$m-thick green sheets.

As shown in FIG. 1, on the thus-prepared green sheet 1, inner conductors 2, 3, 4, and 5 that would eventually become inductor-array patterns were formed by printing a paste whose metal component is 100% Ag. Five pieces of green sheet 1 on which such inner conductors 2, 3, 4, and 5 had been formed were prepared, laminated together and then pressed. Subsequently, the obtained laminated product was sintered in air for two hours at 930° C.

Figure 2:
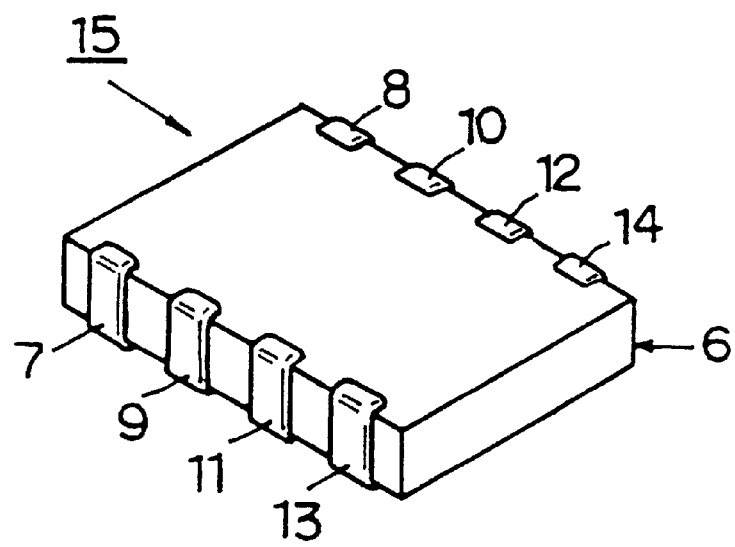
FIG. 2 is a perspective view showing an inductor array fabricated be use of a green sheet 1 shown in FIG. 1.

As shown in FIG. 2, a Ag paste was applied onto the respective portions where inner conductors 2–5 (see FIG. 1) were respectively exposed on the outer surfaces of the obtained sintered body 6, followed by sintering in air for 30 minutes at 800° C. to thereby form respective outer conductors 7, 8, 9, 10, 11, 12, 13 and 14. The respective outer conductors 7, 8, 9, 10, 11, 12, 13 and 14 constitute outer terminal contacts to be electrically connected with their corresponding inner conductors 2–5.

A pressure cooker test (PCT) was performed for 100 hours at 120° C. and 95% relative humidity on each specimen inductor array 15 comprising inductor elements having a laminate construction into which the thus-obtained inner conductors 2–5 are built. During the PCT, 50 volts DC was continuously applied between outer inductors 7 and 8, between outer inductors 9 and 10, between outer inductors 11 and 12 and between outer inductors 13 and 14.

After the PCT, the insulation resistance of each specimen was measured, and the sintering level was evaluated by dipping the specimen into a penetration test solution. The criteria of judgment are as follows: a specimen whose insulation resistance is less than $1 \times 10^8$ ($\Omega$) is classified as "poor." Table 1 shows the number of specimens rated as "poor" out of ten specimens.

TABLE 1

| Sample No. | $Bi_2O_3$ (parts by weight) | Sintering aid (parts by weight) | Composition of sintering aid (mol %) | | | | | | | | Incidence of poor insulation (n = 10) | Penetration test results |
|---|---|---|---|---|---|---|---|---|---|---|---|---|
| | | | $Li_2O$ | MgO | CaO | SrO | BaO | $SiO_2$ | $TiO_2$ | $B_2O_3$ | | |
| 1* | 0 | 5 | 25 | 2 | 6 | 6 | 6 | 20 | 7 | 28 | 10 | Poor |
| 2* | 0 | 0 | — | — | — | — | — | — | — | 0 | 10 | Poor |
| 3* | 0 | 5 | 1 | 2 | 10 | 10 | 10 | 60 | 7 | 0 | 1 | Poor |
| 4 | 0 | 5 | 2 | 2 | 10 | 10 | 10 | 59 | 7 | 0 | 0 | Good |
| 5 | 0 | 5 | 25 | 2 | 6 | 6 | 6 | 48 | 7 | 0 | 0 | Good |
| 6 | 0 | 5 | 45 | 2 | 6 | 6 | 6 | 28 | 7 | 0 | 0 | Good |
| 7* | 0 | 5 | 50 | 2 | 6 | 6 | 6 | 23 | 7 | 0 | 0 | Good |
| 8* | 0 | 5 | 30 | 0 | 0 | 0 | 0 | 60 | 10 | 0 | 3 | Poor |
| 9 | 0 | 5 | 25 | 5 | 0 | 0 | 0 | 60 | 10 | 0 | 0 | Good |
| 10 | 0 | 5 | 25 | 0 | 5 | 0 | 0 | 60 | 10 | 0 | 0 | Good |
| 11 | 0 | 5 | 25 | 0 | 0 | 5 | 0 | 60 | 10 | 0 | 0 | Good |
| 12 | 0 | 5 | 25 | 0 | 0 | 0 | 5 | 60 | 10 | 0 | 0 | Good |
| 13* | 0 | 5 | 28 | 2 | 0 | 0 | 0 | 60 | 10 | 0 | 3 | Poor |
| 14* | 0 | 5 | 28 | 0 | 2 | 0 | 0 | 60 | 10 | 0 | 1 | Poor |
| 15* | 0 | 5 | 28 | 0 | 0 | 2 | 0 | 60 | 10 | 0 | 2 | Poor |
| 16* | 0 | 5 | 28 | 0 | 0 | 0 | 2 | 60 | 10 | 0 | 1 | Poor |
| 17 | 0 | 5 | 25 | 10 | 10 | 10 | 10 | 25 | 10 | 0 | 0 | Good |
| 18* | 0 | 5 | 20 | 10 | 10 | 10 | 15 | 25 | 10 | 0 | 2 | Poor |
| 19* | 0 | 5 | 5 | 2 | 6 | 6 | 6 | 60 | 15 | 0 | 6 | Poor |
| 20 | 0 | 5 | 10 | 2 | 6 | 6 | 6 | 60 | 10 | 0 | 0 | Good |
| 21 | 0 | 5 | 25 | 10 | 10 | 10 | 10 | 15 | 20 | 0 | 0 | Good |

TABLE 1-continued

| Sample No. | Bi₂O₃ (parts by weight) | Sintering aid (parts by weight) | Composition of sintering aid (mol %) | | | | | | | | Incidence of poor insulation (n = 10) | Penetration test results |
| --- | --- | --- | --- | --- | --- | --- | --- | --- | --- | --- | --- | --- |
| | | | Li₂O | MgO | CaO | SrO | BaO | SiO₂ | TiO₂ | B₂O₃ | | |
| 22* | 0 | 5 | 25 | 10 | 10 | 10 | 10 | 10 | 25 | 0 | 7 | Good |
| 23 | 0 | 0.1 | 25 | 2 | 6 | 6 | 6 | 48 | 7 | 0 | 0 | Good |
| 24 | 0 | 1 | 25 | 2 | 6 | 6 | 6 | 58 | 7 | 0 | 0 | Good |
| 25 | 0 | 10 | 25 | 2 | 6 | 6 | 6 | 48 | 7 | 0 | 0 | Good |
| 26 | 0 | 30 | 25 | 2 | 6 | 6 | 6 | 48 | 7 | 0 | 0 | Good |
| 27* | 0 | 40 | 25 | 2 | 6 | 6 | 6 | 48 | 7 | 0 | 2 | Poor |
| 28 | 0.01 | 5 | 25 | 2 | 6 | 6 | 6 | 48 | 7 | 0 | 0 | Good |
| 29 | 0.1 | 5 | 25 | 2 | 6 | 6 | 6 | 48 | 7 | 0 | 0 | Good |
| 30 | 10 | 5 | 25 | 2 | 6 | 6 | 6 | 48 | 7 | 0 | 0 | Good |
| 31* | 15 | 5 | 25 | 2 | 6 | 6 | 6 | 48 | 7 | 0 | 4 | Good |

The specimens marked with * were produced under conditions falling outside the scope of the present invention or out of the preferable range mentioned above.

Li₂O in the sintering aid has the effect of lowering the sintering temperature. Specimen 3, which contains only 1 mol % Li₂O, was not able to be sintered at 930° C.; and, in contrast, in the production process for Specimen 7, which contains as much as 50 mol % Li₂O, the laminated product softened during sintering. This suggests that the sintering aid preferably contains Li₂O within a range of about 2–45 mol % and more preferably about 10–25 mol %.

RO (R represents at least one element selected from the group consisting of Ba, Sr, Ca and Mg) contributes to the sintering characteristics. The RO content is within the range of about 5–40 mol % in Specimens 9 to 12 and 17; is less than 5 mol % in Specimens 13 to 16; and is more than 40 mol% in Specimen 18. In Specimens 13 to 16 and 18, sintering was impossible or difficult. In contrast, in Specimens 9 to 12 and 17, sintering was performed at 930° C. This suggests that the sintering aid preferably contains RO within a range of about 5–40 mol % and more preferably about 20–35 mol %.

SiO₂ and/or TiO₂ has the effect of increasing the insulating properties and also of hindering sintering. Specimen 19 was not sintered at 930° C. because the total content of SiO₂ and TiO₂ was as high as 75 mol %. Specimen 22 had a problem in terms of insulating properties because it contained SiO₂ in an amount of 10 mol %. This suggests that the sintering aid preferably contains (Ti, Si)O₂ in an amount of about 30–70 mol % as in Specimens 20 and 21, and more preferably about 35–66 mol %, and that the sintering aid preferably contains SiO₂ in an amount of about 15 mol % or more, preferably at least about 35 mol %.

When added in small amounts, the sintering aid has the effect of enabling low-temperature sintering, but when added in excessive amounts, the sintering aid has the effect of suppressing sintering. With respect of the content of sintering aid in Specimens 2 and 23 to 27, Specimen 2 could not be sintered at 930° C. or lower because it contained no sintering aid. Specimen 27 also could not be sintered at 930° C. because the content of sintering aid was as high as 40 parts by weight with respect to 100 parts by weight of ferrite. In combination with the results for Specimens 23 to 26, this suggests that the content of sintering aid is preferably determined in a range of about 0.05–30 parts by weight with respect to 100 parts by weight of ferrite, more preferably about 1–10 parts.

When added in small amounts, Bi₂O₃ has the effect of improving the wettability between ferrite and sintering aid and the effect of enabling low-temperature sintering. However, when added in excessive amounts, Bi₂O₃ results in poor contact between inner conductors 2 to 5 and outer conductors 7 to 14 because of the diffusion of Ag contained in inner conductors 2 to 5. Regarding the content of Bi₂O₃, the data of Specimens 5 and 28 to 31 are shown in the following Table 2. Table 2 shows the amount of Bi₂O₃ (which is also shown in Table 1); the number, based on 10 specimens, of occurrences of poor contact between inner conductors 2 to 5 and outer conductors 7 to 14; and the sintering temperature. The sintering temperature was determined based on the results of the penetration test.

TABLE 2

| Sample No. | Bi₂O₃ (parts by weight) | Incidence of poor contact (n = 10) | Sintering temperature (° C.) |
| --- | --- | --- | --- |
| 5 | 0 | 0 | 930 |
| 28 | 0.01 | 0 | 925 |
| 29 | 0.1 | 0 | 900 |
| 30 | 10.0 | 0 | 875 |
| 31* | 15.0 | 4 | 870 |

The results for Specimens 5 and 28 to 31 shown in Table 2 suggest that Specimens 28 to 31 containing Bi₂O₃ could be sintered at lower temperature than could Specimen 5 containing no Bi₂O₃.

With respect to the amount of added Bi₂O₃, as shown in Specimen 31, when Bi₂O₃ was added in an amount of 15 parts by weight or more with respect to 100 parts by weight of ferrite, poor contact between inner conductors 2 to 5 and outer conductors 7 to 14 occurred because of the diffusion of Ag contained in inner conductors 2 to 5, as mentioned above. In Specimens 5 and 28 to 30, no poor contact occurred. This suggests that Bi₂O₃ is preferably added in an amount of about 0.01–10 parts by weight with respect to 100 parts by weight of ferrite.

EXAMPLE 2

Oxide components were weighed, and dry-mixed and dry-milled for 16 hours in POLYPOT with alumina balls serving as crushing balls, so as to obtain sintering aids having compositions shown in Table 3 below.

Thereafter, the procedure of Example 1 was performed, except that the above-described oxide sintering aids were used instead of the sintering aids composed of silicate glass used in Example 1, to thereby produce inductor arrays 15, an example of which is depicted in FIG. 2.

Each specimen of the thus-obtained inductor arrays 15 was subjected to a pressure cooker test (PCT), then to measurement of insulation resistance and evaluation of sintering degree by soaking in a penetration test solution in a manner similar to that of Example 1. The results are shown in Table 3.

After each block were punched to form a ring having a outer diameter of 20 mm and a inner diameter of 10 mm, the rings were heated at a rate of 10° C./min, kept at 500° C. for 10 minutes and cooled to a room temperature at a rate of 10° C./min, thereby being subject to a denbinder treatment. Thereafter, the rings were heated to 870–930° C. at a rate of

TABLE 3

| Sample No. | $Bi_2O_3$ (parts by weight) | Sintering aid (parts by weight) | Composition of sintering aid (mol %) | | | | | | | Incidence of poor insulation (n = 10) | Penetration test results |
|---|---|---|---|---|---|---|---|---|---|---|---|
| | | | $Li_2O$ | MgO | CaO | SrO | BaO | $SiO_2$ | $TiO_2$ | | |
| 32 | 0 | 5 | 2 | 2 | 10 | 10 | 10 | 59 | 7 | 0 | Good |
| 33 | 0 | 5 | 25 | 2 | 6 | 6 | 6 | 48 | 7 | 0 | Good |
| 34 | 0 | 5 | 45 | 2 | 6 | 6 | 6 | 28 | 7 | 0 | Good |
| 35 | 0 | 5 | 25 | 5 | 0 | 0 | 0 | 60 | 10 | 0 | Good |
| 36 | 0 | 5 | 25 | 0 | 5 | 0 | 0 | 60 | 10 | 0 | Good |
| 37 | 0 | 5 | 25 | 0 | 0 | 5 | 0 | 60 | 10 | 0 | Good |
| 38 | 0 | 5 | 25 | 0 | 0 | 0 | 5 | 60 | 10 | 0 | Good |
| 39 | 0 | 5 | 25 | 10 | 10 | 10 | 10 | 25 | 10 | 0 | Good |
| 40 | 0 | 5 | 10 | 2 | 6 | 6 | 6 | 60 | 10 | 0 | Good |
| 41 | 0 | 5 | 25 | 10 | 10 | 10 | 10 | 15 | 20 | 0 | Good |
| 42 | 0 | 0.1 | 25 | 2 | 6 | 6 | 6 | 48 | 7 | 0 | Good |
| 43 | 0 | 1 | 25 | 2 | 6 | 6 | 6 | 48 | 7 | 0 | Good |
| 44 | 0 | 10 | 25 | 2 | 6 | 6 | 6 | 48 | 7 | 0 | Good |
| 45 | 0 | 30 | 25 | 2 | 6 | 6 | 6 | 48 | 7 | 0 | Good |
| 46 | 0.01 | 5 | 25 | 2 | 6 | 6 | 6 | 48 | 7 | 0 | Good |
| 47 | 0.1 | 5 | 25 | 2 | 6 | 6 | 6 | 48 | 7 | 0 | Good |
| 48 | 10 | 5 | 25 | 2 | 6 | 6 | 6 | 48 | 7 | 0 | Good |

All Specimens 32 through 48 fall within the scope (compositional range) of the present invention; moreover, they fall within the above-described preferable range.

In other words, the sintering aids comprise $Li_2O$ in an amount of about 2–45 mol %, RO (R represents at least one element selected from the group consisting of Ba, Sr, Ca, and Mg) in an amount of about 5–40 mol %, and (Ti, Si)$O_2$ in an amount of about 30–70 mol %, the amount of $SiO_2$ being about 15 mol % or more. $Bi_2O_3$ was added to all the Specimens 46 through 48 within about 0.01–10 parts by weight with respect to 100 parts by weight of ferrite.

Thus, none of the Specimens 32 through 48 had a problem with regard to insulation properties and sintered well at 930°.

EXAMPLE 3

In order to obtain sintering aids composed of silicate glass whose compositions are shown in Table 4 below, oxides, carbonates, or hydroxides of the respective components were mixed, fused and then rapidly cooled. The silicate glass obtained was subjected to dry milling for 16 hours in POLYPOT with alumina balls serving as crushing balls.

Independently, in order to obtain the primary component ferrite, 47.5 mol % $Fe_2O_3$, 1.0 mol % ZnO, 37.5 mol % NiO and 14.0 mol % Cuo were mixed.

The sintering aids and $Bi_2O_3$ were mixed in the amounts (parts by weight) shown in Table 4 with respect to 100 parts by weight of the above-mentioned ferrite component and subjected to wet milling for 16 hours in POLYPOT with alumina balls serving as crushing balls.

Then, an acrylic-emulsion binder was added in an amount of 8 wt % to the ferrite component and mixed through use of the doctor blade method to produce 50-Fm-thick green sheets.

The green sheets were cut into pieces having a dimension of 60×80 mm, and the pieces were stacked so as to have a thickness of 1 mm and were heat-pressed at 70° C. and a pressure of 1500 kg/cm$^2$ to obtain multilayered blocks.

10° C./min, kept at that temperature for an hour and cooled to a room temperature at a rate of 10° C./min, thereby obtaining sintered rings.

Conductive wire were wound around thus obtained each sintered ring by 40 turns, and an initial magnetic permeability ($\mu_i$) at 20° C. and a temperature range of −25 to 125° C. were measured for each sintered ring. A temperature coefficient of an initial magnetic permeability ($\alpha\mu_{ir}$) was also calculated from the measuring results. The temperature coefficient of an initial magnetic permeability ($\alpha\mu_{ir}$) is given by the following equation:

$$\alpha\mu_{ir} = \Delta\mu_i/\mu_i^2 \cdot 1/\Delta T$$

where $\Delta\mu_i$ is a change amount of $\mu_i$ in the range of −25 to 125° C., $\mu_i$ is an initial magnetic permeability ($\mu_i$) at 20° C. and $\Delta T$ is a temperature range of −25 to 125° C., i.e., 150° C.

Table 4 shows the initial magnetic permeability ($\mu_i$) and the temperature coefficient of an initial magnetic permeability ($\alpha\mu_{ir}$) for each specimen. Note that in Table 4, the specimens marked with * were produced under conditions falling outside the scope of the present invention or out of the preferable range mentioned above.

As can be understood from Table 4, when the sintering aid within the scope of the present invention is employed with Ni-Cu-Zn ferrite, the obtained magnetic ceramics has an initial magnetic permeability ($\mu_i$) of 10 or less and a temperature coefficient of an initial magnetic permeability ($\alpha\mu_{ir}$) 500 ppm/° C. or less. Theses characteristics are specifically preferable for inductors for high frequency use, and more preferable for chip type inductors for high frequency use.

Conventionally, magnetic ceramics having both such a small initial magnetic permeability and such a small temperature coefficient of an initial magnetic permeability has not known. For example, Specimen 2–4 which comprises oxide according to a conventional art shows the temperature coefficient of an initial magnetic permeability ($\alpha\mu_{ir}$)

becomes more than 500 ppm/° C. Specimen 1 which comprises no sintering aid also shows an initial magnetic permeability ($\mu_i$) more than 10.

Other specimens which are outside the scope of the present invention also generally shows that either an initial magnetic permeability ($\mu_i$) is more than 10 or a temperature coefficient of an initial magnetic permeability ($\alpha\mu_{ir}$) is more than 500 ppm/° C. It is true that some specimens which are outside the scope of the present invention have an initial magnetic permeability ($\mu_i$) of 10 or less and a temperature coefficient of an initial magnetic permeability ($\alpha\mu_{ir}$) 500 ppm/° C. or less but these specimens are not preferable as they have drawbacks as explained in Example 1.

Ba, Sr, Ca, and Mg) in an amount of about 5–40 mol %, and (Ti, Si)$O_2$ in an amount of about 30–70 mol % (wherein the amount of $SiO_2$ is about 15 mol % or more), the composition may be sintered well at a temperature as low as, for example, 930° C. or less.

When the magnetic ceramic composition according to the present invention contains a sintering aid in an amount of about 0.05–10 parts by weight with respect to 100 parts by weight of ferrite, the composition may be sintered well at a temperature as low as, for example, 930° C. or less, as described above.

When the magnetic ceramic composition according to the present invention further contains $Bi_2O_3$ in an amount of

TABLE 4

| Sample No. | $Bi_2O_3$ (parts by weight) | Sintering aid (parts by weight) | Composition of sintering aid (mol %) | | | | | | | | $\mu_i$ | $\alpha\mu_{ir}$ |
|---|---|---|---|---|---|---|---|---|---|---|---|---|
| | | | $Li_2O$ | MgO | CaO | SrO | BaO | $SiO_2$ | $TiO_2$ | $B_2O_3$ | | |
| 1* | 0 | 0 | — | — | — | — | — | — | — | — | 18 | 650 |
| 2* | 3($SiO_2$) | 0 | — | — | — | — | — | — | — | — | 14 | 1500 |
| 3* | 3($Co_3O_4$) | 0 | — | — | — | — | — | — | — | — | 5 | 900 |
| 4* | 3 | 0 | — | — | — | — | — | — | — | — | 7 | 600 |
| 5* | 0 | 3 | 25 | 2 | 6 | 6 | 6 | 20 | 7 | 28 | 8 | 400 |
| 6* | 0 | 3 | 1 | 2 | 10 | 10 | 10 | 60 | 7 | 0 | 13 | 1000 |
| 7 | 0 | 3 | 2 | 2 | 10 | 10 | 10 | 59 | 7 | 0 | 7 | 350 |
| 8 | 0 | 3 | 25 | 2 | 6 | 6 | 6 | 48 | 7 | 0 | 5 | 200 |
| 9 | 0 | 3 | 45 | 2 | 6 | 6 | 6 | 28 | 7 | 0 | 6 | 220 |
| 10* | 0 | 3 | 50 | 2 | 6 | 6 | 6 | 23 | 7 | 0 | 7 | 250 |
| 11* | 0 | 3 | 30 | 0 | 0 | 0 | 0 | 60 | 10 | 0 | 14 | 700 |
| 12 | 0 | 3 | 25 | 5 | 0 | 0 | 0 | 60 | 10 | 0 | 5 | 230 |
| 13 | 0 | 3 | 25 | 0 | 5 | 0 | 0 | 60 | 10 | 0 | 6 | 180 |
| 14 | 0 | 3 | 25 | 0 | 0 | 5 | 0 | 60 | 10 | 0 | 7 | 220 |
| 15 | 0 | 3 | 25 | 0 | 0 | 0 | 5 | 60 | 10 | 0 | 5 | 200 |
| 16* | 0 | 3 | 28 | 2 | 0 | 0 | 0 | 60 | 10 | 0 | 12 | 600 |
| 17* | 0 | 3 | 28 | 0 | 2 | 0 | 0 | 60 | 10 | 0 | 14 | 550 |
| 18* | 0 | 3 | 28 | 0 | 0 | 2 | 0 | 60 | 10 | 0 | 13 | 600 |
| 19* | 0 | 3 | 28 | 0 | 0 | 0 | 2 | 60 | 10 | 0 | 11 | 550 |
| 20 | 0 | 3 | 25 | 10 | 10 | 10 | 10 | 25 | 10 | 0 | 6 | 300 |
| 21* | 0 | 3 | 20 | 10 | 10 | 10 | 15 | 25 | 10 | 0 | 8 | 610 |
| 22* | 0 | 3 | 5 | 2 | 6 | 6 | 6 | 60 | 15 | 0 | 15 | 800 |
| 23 | 0 | 3 | 10 | 2 | 6 | 6 | 6 | 60 | 10 | 0 | 5 | 250 |
| 24 | 0 | 3 | 25 | 10 | 10 | 10 | 10 | 15 | 20 | 0 | 6 | 230 |
| 25* | 0 | 3 | 25 | 10 | 10 | 10 | 10 | 10 | 25 | 0 | 8 | 350 |
| 26 | 0 | 0.1 | 25 | 2 | 6 | 6 | 6 | 48 | 7 | 0 | 6 | 250 |
| 27 | 0 | 1 | 25 | 2 | 6 | 6 | 6 | 48 | 7 | 0 | 7 | 400 |
| 28 | 0 | 10 | 25 | 2 | 6 | 6 | 6 | 48 | 7 | 0 | 4 | 120 |
| 29 | 0 | 30 | 25 | 2 | 6 | 6 | 6 | 48 | 7 | 0 | 4 | 100 |
| 30* | 0 | 40 | 25 | 2 | 6 | 6 | 6 | 48 | 7 | 0 | 6 | 150 |
| 31 | 0.01 | 3 | 25 | 2 | 6 | 6 | 6 | 48 | 7 | 0 | 6 | 120 |
| 32 | 0.1 | 3 | 25 | 2 | 6 | 6 | 6 | 48 | 7 | 0 | 5 | 100 |
| 33 | 10 | 3 | 25 | 2 | 6 | 6 | 6 | 48 | 7 | 0 | 4 | 80 |
| 34* | 15 | 3 | 25 | 2 | 6 | 6 | 6 | 48 | 7 | 0 | 5 | 150 |

In the above-described examples, Ni-Cu-Zn-based ferrite was used. However, use of Ni-based ferrite or Ni-Zn-based ferrite other than the Ni-Cu-Zn-based ferrite were confirmed to provide almost identical effects.

As described above, the magnetic ceramic composition according to the present invention containing no boron prevents migration of the inner conductor during the sintering process. Therefore, the present invention obviates the drawback that resultant inductor elements suffer from insulation deterioration and increased direct-current resistance. Needless to say, the present invention also satisfactorily secures the effects attained by the prior art techniques; i.e., inductor elements having high-frequency characteristics are obtained from sintering at low sintering temperature.

When the sintering aid contained in the magnetic ceramic composition according to the present invention contains $Li_2O$ in an amount of about 2–45 mol %, RO (R represents at least one element selected from the group consisting of about 0.01–10 parts by weight with respect to 100 parts by weight of ferrite, wettability between the ferrite and the sintering aid is improved. Thus, when an inner conductor contains Ag, diffusion of Ag is prevented while there is maintained sinterability at a temperature as low as, for example, 930° C. or less, to thereby effectively suppress generation of contact failure between the inner conductor and an outer conductor.

Thus, the inductor element according to the present invention that contains the above-described characteristic magnetic ceramic composition serving as a magnetic element suppresses insulation deterioration or increase of direct-current resistance in inductor elements.

The present invention, when applied to inductor elements, i.e., laminated elements containing an inner conductor therein, suppresses migration of the inner conductor, to thereby produce inductor elements free of contact failure between the inner conductor and an outer conductor.

What is claimed is:

1. A magnetic ceramic composition comprising ferrite and a boron-free sintering aid which contains about 2–45 mol % $Li_2O$; 5–40 mol % RO in which R is at least one element selected from the group consisting of Ba, Sr, Ca and Mg; and about 30–70 mol % $TiO_2$ and $SiO_2$ in which the $SiO_2$ is at least about 15 mol %.

2. The magnetic ceramic composition according to claim 1, wherein the sintering aid content in the magnetic ceramic composition is about 0.05–30 parts by weight with respect to 100 parts by weight of ferrite.

3. The magnetic ceramic composition according to claim 2, wherein at least a fraction of the sintering aid comprises silicate glass.

4. The magnetic ceramic composition according to claim 3, which further contains about 0.01–10 parts by weight of $Bi_2O_3$ with respect to 100 parts by weight of ferrite.

5. The magnetic ceramic composition according to claim 5, wherein at least a fraction of the sintering aid is silicate glass, and at least a fraction of the $Bi_2O_3$ is present as a component of the silicate glass.

6. The magnetic ceramic composition according to claim 5, wherein the ferrite is Ni-based ferrite, Ni-Zn-based ferrite or Ni-Cu-Zn-based ferrite.

7. The magnetic ceramic composition according to claim 1, wherein at least a fraction of the sintering aid comprises silicate glass.

8. The magnetic ceramic composition according to claim 1, which further contains about 0.01–10 parts by weight of $Bi_2O_3$ with respect to 100 parts by weight of ferrite.

9. The magnetic ceramic composition according to claim 8, wherein at least a fraction of the sintering aid is silicate glass, and at least a fraction of the $Bi_2O_3$ is present as a component of the silicate glass.

10. The magnetic ceramic composition according to claim 1, wherein the ferrite is Ni-based ferrite, Ni-Zn-based ferrite or Ni-Cu-Zn-based ferrite.

11. The magnetic ceramic composition according to claim 10, wherein the magnetic ceramic composition has an initial magnetic permeability ($\mu_i$) of 10 or less and a temperature coefficient of an initial magnetic permeability ($\alpha\mu_{ir}$) 500 ppm/° C. or less.

12. An inductor element containing a magnetic substance which comprises a magnetic ceramic composition of claim 1.

13. The inductor element according to claim 12, comprising a laminate containing a silver-containing inner conductor therein.

14. An inductor element containing a magnetic substance which comprises a magnetic ceramic composition of claim 4.

15. The inductor element according to claim 14, comprising a laminate containing a silver-containing inner conductor therein.

16. An inductor element containing a magnetic substance which comprises a magnetic ceramic composition of claim 14.

17. The inductor element according to claim 16, comprising a laminate containing a silver-containing inner conductor therein.

* * * * *